United States Patent
Loxley et al.

(10) Patent No.: US 9,939,707 B2
(45) Date of Patent: Apr. 10, 2018

(54) TIR-MODULATED WIDE VIEWING ANGLE DISPLAY

(71) Applicant: CLEARink Displays, Inc., Santa Clara, CA (US)

(72) Inventors: Andrew Loxley, Philadelphia, PA (US); Anthony E. Pullen, Tucson, AZ (US); Boon Chong Ng, Vancouver (CA); Bram M. Sadlik, Vancouver (CA)

(73) Assignee: CLEARink Displays, Inc., Fremont, CA (US)

(*) Notice: Subject to any disclaimer, the term of this patent is extended or adjusted under 35 U.S.C. 154(b) by 58 days.

(21) Appl. No.: 14/903,547

(22) PCT Filed: Jul. 8, 2013

(86) PCT No.: PCT/US2013/049606
§ 371 (c)(1),
(2) Date: Feb. 5, 2016

(87) PCT Pub. No.: WO2015/005899
PCT Pub. Date: Jan. 15, 2015

(65) Prior Publication Data
US 2016/0147128 A1    May 26, 2016

(51) Int. Cl.
*G02B 5/128* (2006.01)
*G02F 1/19* (2006.01)
(Continued)

(52) U.S. Cl.
CPC ............. *G02F 1/195* (2013.01); *G02B 5/128* (2013.01); *G09G 3/344* (2013.01); *G02F 1/167* (2013.01);
(Continued)

(58) Field of Classification Search
CPC .......... G02B 5/128; G02B 5/126; G02B 5/13; G02F 1/167; G02F 1/195;
(Continued)

(56) References Cited

U.S. PATENT DOCUMENTS 3,792,308 A    2/1974 Ota et al.
3,919,031 A   11/1975 White
(Continued)

FOREIGN PATENT DOCUMENTS

AT    333109 T     8/2006
CA    2292441 C    7/2002
(Continued)

OTHER PUBLICATIONS

International Search Report and Written Opinion dated Jul. 8, 2014 for PCT Application No. PCT/US2013/049606.
(Continued)

*Primary Examiner* — James Phan
(74) *Attorney, Agent, or Firm* — Dianoosh Salehi

(57) ABSTRACT

Improvements and modifications are provided in the type of frustrated total internal reflection (TIR) systems described in U.S. Pat. Nos. 6,885,496; 6,891,658; 7,286,280; 7,760,417 and 8,040,591. The improvements and modifications include various methods to improve display operation of hemispherical beaded front plane TIR systems such as (a) inhibit or prevent the undesired non-uniform distribution and lateral migration of charged, electrophoretically mobile, TIR frustrating particles by encapsulating or tethering the particles to the beaded front plane surface; (b) inhibit or prevent the settling of the TIR frustrating particles such as modifying the viscosity of the low refractive index medium; and (c) inhibit or prevent the non-uniformity of the applied electric field during display operation such as using a conforming rear electrode.

3 Claims, 10 Drawing Sheets

(51) Int. Cl.
    *G09G 3/34* (2006.01)
    *G02F 1/167* (2006.01)
(52) U.S. Cl.
    CPC .......... *G02F 2001/1676* (2013.01); *G02F 2001/1678* (2013.01); *G09G 2320/068* (2013.01)
(58) Field of Classification Search
    CPC .... G02F 2001/1676; G02F 2001/1678; G09G 3/344; G09G 2320/068
    USPC .............. 359/222.1, 534, 536, 227, 228
    See application file for complete search history.

(56) References Cited

U.S. PATENT DOCUMENTS

| | | |
|---|---|---|
| 4,025,674 A | 5/1977 | Mizuochi |
| 4,071,430 A | 1/1978 | Liebert |
| 4,203,106 A | 5/1980 | Dalisa et al. |
| 4,648,956 A | 3/1987 | Marhsall et al. |
| 4,821,092 A | 4/1989 | Noguchi |
| 5,019,748 A | 5/1991 | Appelberg |
| 5,319,491 A | 6/1994 | Selbrede |
| 5,359,346 A | 10/1994 | Disanto |
| 5,396,350 A | 3/1995 | Beeson et al. |
| 5,596,671 A | 1/1997 | Rockwell, III |
| 5,871,653 A | 2/1999 | Ling |
| 5,959,777 A | 9/1999 | Whitehead |
| 5,999,307 A | 12/1999 | Whitehead et al. |
| 6,064,784 A | 5/2000 | Whitehead et al. |
| 6,215,920 B1 | 4/2001 | Whitehead et al. |
| 6,304,365 B1 | 10/2001 | Whitehead et al. |
| 6,376,828 B1 | 4/2002 | Barrett |
| 6,377,383 B1 | 4/2002 | Whitehead et al. |
| 6,384,979 B1 | 5/2002 | Whitehead et al. |
| 6,437,921 B1 | 8/2002 | Whitehead |
| 6,452,734 B1 | 9/2002 | Whitehead et al. |
| 6,574,025 B2 | 6/2003 | Whitehead et al. |
| 6,751,008 B2 | 6/2004 | Liang et al. |
| 6,822,783 B2 | 11/2004 | Matsuda et al. |
| 6,842,279 B2 | 1/2005 | Amundson |
| 6,865,011 B2 | 3/2005 | Whitehead et al. |
| 6,885,496 B2 | 4/2005 | Whitehead et al. |
| 6,891,658 B2 | 5/2005 | Whitehead et al. |
| 7,046,439 B2 | 5/2006 | Kaminsky et al. |
| 7,093,968 B2 | 8/2006 | Hsueh et al. |
| 7,164,536 B2 | 1/2007 | Whitehead |
| 7,170,670 B2 | 1/2007 | Webber |
| 7,259,744 B2 | 8/2007 | Arango et al. |
| 7,286,280 B2 | 10/2007 | Whitehead et al. |
| 7,324,263 B2 | 1/2008 | Johnson et al. |
| 7,422,964 B2 | 9/2008 | Akiyama |
| 7,439,948 B2 | 10/2008 | Johnson et al. |
| 7,454,103 B2 | 11/2008 | Parriaux |
| 7,463,398 B2 | 12/2008 | Feenstra |
| 7,507,012 B2 | 3/2009 | Aylward et al. |
| 7,515,326 B2 | 4/2009 | Ibrede et al. |
| 7,564,614 B2 | 7/2009 | Chen et al. |
| 7,660,509 B2 | 2/2010 | Bryan et al. |
| 7,740,387 B2 | 6/2010 | Schultz et al. |
| 7,760,417 B2 | 7/2010 | Whitehead |
| 7,775,700 B2 | 8/2010 | Lee |
| 7,852,430 B1 | 12/2010 | Gettmey |
| 7,940,457 B2 | 5/2011 | Jain et al. |
| 8,022,615 B2 | 9/2011 | Bai et al. |
| 8,040,591 B2 | 10/2011 | Whitehead |
| 8,094,364 B2 | 1/2012 | Park |
| 8,384,659 B2 | 2/2013 | Yeo et al. |
| 8,587,512 B2 | 11/2013 | Hiji et al. |
| 8,690,408 B2 | 4/2014 | Li |
| 9,360,696 B1 | 6/2016 | Ghali et al. |
| 9,377,574 B2 | 6/2016 | Li |
| 2002/0089735 A1 | 7/2002 | Albert et al. |
| 2002/0171910 A1 | 11/2002 | Pullen et al. |
| 2003/0038755 A1 | 2/2003 | Amundson et al. |
| 2003/0067666 A1 | 4/2003 | Kawai |
| 2003/0165016 A1 | 9/2003 | Whitehead et al. |
| 2003/0214697 A1 | 11/2003 | Duthaler et al. |
| 2004/0136047 A1 | 7/2004 | Whitehead et al. |
| 2004/0174584 A1 | 9/2004 | Whitehead et al. |
| 2004/0239613 A1 | 12/2004 | Kishi |
| 2005/0007000 A1 | 1/2005 | Chou et al. |
| 2005/0270439 A1 | 12/2005 | Weber et al. |
| 2006/0056009 A1 | 3/2006 | Kombrekke et al. |
| 2006/0148262 A1 | 7/2006 | Lee et al. |
| 2006/0209418 A1 | 9/2006 | Whitehead |
| 2006/0291034 A1 | 12/2006 | Patry et al. |
| 2007/0008739 A1 | 1/2007 | Kim et al. |
| 2007/0019434 A1 | 1/2007 | Lee |
| 2007/0047003 A1 | 3/2007 | Suwabe |
| 2007/0091434 A1 | 4/2007 | Garner et al. |
| 2007/0263137 A1 | 11/2007 | Shigeta et al. |
| 2008/0174852 A1 | 7/2008 | Hirai et al. |
| 2008/0203910 A1 | 8/2008 | Reynolds |
| 2008/0204854 A1 | 8/2008 | Whitehead et al. |
| 2008/0219024 A1 | 9/2008 | Mi et al. |
| 2008/0231960 A1 | 9/2008 | Van Gorkom et al. |
| 2008/0266245 A1 | 10/2008 | Wilcox |
| 2008/0285282 A1 | 11/2008 | Karman et al. |
| 2008/0297496 A1 | 12/2008 | Watson et al. |
| 2008/0303994 A1 | 12/2008 | Jeng et al. |
| 2008/0304134 A1 | 12/2008 | Ban |
| 2009/0109172 A1 | 4/2009 | Lee et al. |
| 2009/0201565 A1 | 8/2009 | Bita et al. |
| 2009/0201570 A1 | 8/2009 | Frazier et al. |
| 2009/0207476 A1 | 8/2009 | Yanagisawa et al. |
| 2009/0225398 A1 | 9/2009 | Duthaler et al. |
| 2009/0231714 A1 | 9/2009 | Zhao et al. |
| 2009/0262083 A1 | 10/2009 | Parekh |
| 2009/0262414 A1 | 10/2009 | Whitehead |
| 2009/0322669 A1 | 12/2009 | Bryning et al. |
| 2010/0079843 A1 | 4/2010 | Derichs et al. |
| 2010/0085627 A1 | 4/2010 | Whitehead |
| 2010/0091224 A1 | 4/2010 | Cho et al. |
| 2010/0118383 A1 | 5/2010 | Van Abeelen et al. |
| 2010/0148385 A1 | 6/2010 | Balko et al. |
| 2010/0172016 A1 | 7/2010 | Park et al. |
| 2010/0225575 A1 | 9/2010 | Ishii et al. |
| 2010/0253711 A1 | 10/2010 | Muroi |
| 2011/0043435 A1 | 2/2011 | Hebenstreit et al. |
| 2011/0085232 A1 | 4/2011 | Werner et al. |
| 2011/0273906 A1 | 10/2011 | Nichol et al. |
| 2011/0279442 A1 | 11/2011 | Hage et al. |
| 2011/0299014 A1 | 12/2011 | Jang et al. |
| 2011/0310465 A1 | 12/2011 | Takanashi |
| 2011/0316764 A1 | 12/2011 | Parry-Jones et al. |
| 2012/0008203 A1 | 1/2012 | Ijzerman et al. |
| 2012/0019896 A1 | 1/2012 | Yoshida et al. |
| 2012/0019899 A1 | 1/2012 | Yeo |
| 2012/0026576 A1 | 2/2012 | Bita et al. |
| 2012/0069064 A1 | 3/2012 | Yamakita |
| 2012/0081777 A1 | 4/2012 | Heikenfeld et al. |
| 2012/0113367 A1 | 5/2012 | Kitson et al. |
| 2012/0113499 A1 | 5/2012 | Komatsu |
| 2012/0262496 A1 | 10/2012 | Swic |
| 2012/0293857 A1 | 11/2012 | Kwon et al. |
| 2013/0135320 A1 | 5/2013 | Govil |
| 2013/0182311 A1 | 7/2013 | Mochizuki et al. |
| 2013/0278995 A1 | 10/2013 | Drzaic et al. |
| 2013/0334972 A1 | 12/2013 | Atkins |
| 2014/0333989 A1 | 11/2014 | Whitehead |
| 2014/0340376 A1 | 11/2014 | Itagaki et al. |
| 2015/0146273 A1 | 5/2015 | Whitehead |
| 2016/0097961 A1 | 4/2016 | Whitehead |
| 2016/0139478 A1 | 5/2016 | Whitehead |
| 2016/0147128 A1 | 5/2016 | Loxley et al. |

FOREIGN PATENT DOCUMENTS

| | | |
|---|---|---|
| CA | 2371138 C | 7/2005 |
| CA | 2410955 C | 1/2007 |
| CA | 2474384 C | 8/2010 |
| CA | 2643808 C | 8/2013 |
| CN | 1173208 C | 10/2004 |

(56) References Cited

FOREIGN PATENT DOCUMENTS

| | | |
|---|---|---|
| CN | 101160547 A | 4/2008 |
| CN | 1454327 A | 9/2008 |
| CN | 102955318 A | 3/2013 |
| DE | 69825894 | 9/2005 |
| EP | 1118039 | 2/2003 |
| EP | 0988573 B1 | 8/2004 |
| EP | 1290486 B1 | 10/2004 |
| EP | 1368700 B1 | 7/2006 |
| JP | 2004085635 | 3/2004 |
| JP | 2007505330 | 3/2007 |
| JP | 3965115 | 6/2007 |
| JP | 2007279641 | 10/2007 |
| JP | 4113843 | 4/2008 |
| JP | 2009251215 | 10/2009 |
| JP | 4956610 | 3/2012 |
| JP | 2005519329 | 6/2017 |
| KR | 100949412 | 3/2010 |
| WO | 2003075085 | 9/2003 |
| WO | 2005010604 | 2/2005 |
| WO | 2006108285 | 10/2006 |
| WO | 2006114743 | 11/2006 |
| WO | 2014146937 | 9/2014 |
| WO | 2015116913 | 8/2015 |
| WO | 2015175518 | 11/2015 |
| WO | 2016130720 | 8/2016 |

OTHER PUBLICATIONS

International Search Report and Written Opinion dated Dec. 30, 2014 for PCT Application No. PCT/US2014/058118.
International Search Report and Written Opinion dated Aug. 11, 2014 for PCT Application No. PCT/US2014/030966.
International Search Report and Written Opinion dated Sep. 19, 2014 for PCT Application No. PCT/US2014/038091.
International Search Report and Written Opinion dated Oct. 1, 2015 for PCT Application No. PCT/US2015/030349.
International Search Report and Written Opinion dated Apr. 3, 2015 for PCT Application No. PCT/US2014/061911.
International Search Report and Written Opinion dated Mar. 1, 2016 for PCT Application No. PCT/US2015/013725.
International Search Report and Written Opinion dated Jan. 27, 2016 for PCT Application No. PCT/US2015/054385.
International Search Report and Written Opinion dated Mar. 2, 2016 for PCT Application No. PCT/US2015/062075.
International Search Report and Written Opinion dated Apr. 13, 2016 for PCT Application No. PCT/US2015/066980.
International Search Report and Written Opinion dated Apr. 21, 2016 for PCT Application No. PCT/US2016/017416.
International Search Report and Written Opinion dated Mar. 28, 2016 for PCT Application No. PCT/US2015/0066150.
Mossman, M. A. et al., "A Novel Reflective Image Display Using Total Internal Reflection" Displays Devices, Dempa Publications, Tokyo JP vol. 25, No. 5 Dec. 1, 2004 pp. 215-221.
Gou, S. et al., "Transparent Superhydrophobic Surfaces for Applications of Controlled Reflectance" Applied Optics vol. 51, Issue No. 11, Apr. 10, 2012, pp. 1645-1653.
Whitehead, L. et al., "The Many Roles of Illumination in Information Display" Society for Information Display Symposium (Invited Paper), Issue No. 0097-966X/06/3701-0000, May 2010.
Wong, R. et al., "Electrochemical Threshold Conditions During Electro-Optical Switching of Ionic Electrophorectic Optical Devices" Applied Optics vol. 48, Issue No. 6, Feb. 20, 2009, pp. 1062-1072.
Whitehead, L. et al., "Reflections on Total Internal Reflection" Optics and Photonics News Feb. 2009, pp. 28-34.
Mossman, M. et al., "Observations of Total Internal Reflection at a Natural Super-Hydrophobic Surface" Physics in Canada vol. 64, Issue No. 1, Mar. 2008, pp. 7-11.
Hrudey, P. et al., "Application of Transparent Nanostructured Electrodes for Modulation of Total Internal Reflection" SPIE 2007 Conference Paper No. 6647 Aug. 2007, pp. 1-12.
Hrudey, P. et al., "Variable Diffraction Gratings Using Nanoporous Electrodes and Electrophoresis of Dye Ions" SPIE 2007 Conference Paper No. 6645 Aug. 2007, pp. 1-12.
Nebster, A. et al., "Control of Reflection at an Optical Interface in the Absence of Total Internal Reflection for a Retroreflective Display Application" Applied Optics vol. 45, Issue No. 6, Feb. 20, 2006, pp. 1169-1176.
Mossman, M. et al., "Off the Beaten Path with Total Internal Reflection" International Optical Design Conference (Invited Paper), Jun. 2006, pp. 1-12.
Whitehead, L. et al., "Total Internal Reflection for Illumination and Displays" SPIE Newsroom Sep. 7-8, 2006.
Mossman, M. et al., "Controlled Frustration of TIR by Electrophoresis of Pigment Particles" Applied Optics vol. 44, Issue No. 9, Mar. 20, 2005, pp. 1601-1609.
Kwong, V. et al., "Control of Reflectance of Liquid Droplets by Means of Electrowetting" Applied Optics vol. 43, Issue No. 4, Feb. 1, 2004, pp. 808-813.
Mossman, M. et al. "A High Reflectance, Wide Viewing Angle Reflective Display Using Total Internal Reflection in Mirco-Hemispheres" International Display Research Conference, Issue No. 1083-1312/00/2003-0233, Sep. 2003, pp. 233-236.
Mossman, M. et al., "Grey Scale Control of Total Internal Reflection Using Electrophoresis of Sub-Optical Pigment Particles" International Conference of the Society for Information Display, Boston, MA Issue No. 2-0966X/02/3301-0522, May 2002, pp. 522-525.
Coope, R. et al., "Modulation of Retroreflection by Controlled Frustration of Total Internal Reflection" Applied Optics vol. 41, Issue No. 25, Sep. 1, 2002, pp. 5357-5361.
Mossman, M. et al., "New Method for Maintaining Long Term Image Quality in a TIR Based Electrophoretic Display" International Display Research Conference, Nice, France, Eurodisplay Oct. 2002, pp. 851-854.
Mossman, M. et al., "New Reflective Color Display Technique Based on Total Internal Reflection and Subtractive Color Filtering" International Conference of the Society for Information Display, San Jose, CA Issue No. 1-0966X/01/3201-1054, Jun. 2001, pp. 1054-1057.
Whitehead, L. et al., "Visual Applications of Total Internal Reflection in Prismatic Microstructures" Physics in Canada Nov./Dec. 2001, pp. 329-335.
Mossman, M. et al., "A New Reflective Display Based on Total Internal Reflection in Prismatic Microstructures" Proceedings of the 2000 Society for Information Display, International Display Research Conference, Issue No. 1083-1312/00/2001-0311, Oct. 2000, pp. 311-314.
EP Search Report dated Feb. 8, 2017 for EP Application No. 13889042.1.
Mossman et al. "Brightness Enhancement in TIR-Modulated Electrophoretic Reflective Image Displays", (Biblio).
Atsuhito et al. "Electrophoresis Device, Method of Manufacturing the Electrophoresis Device, Display, Display Substrate, and Electronic Unit", (Abstract).

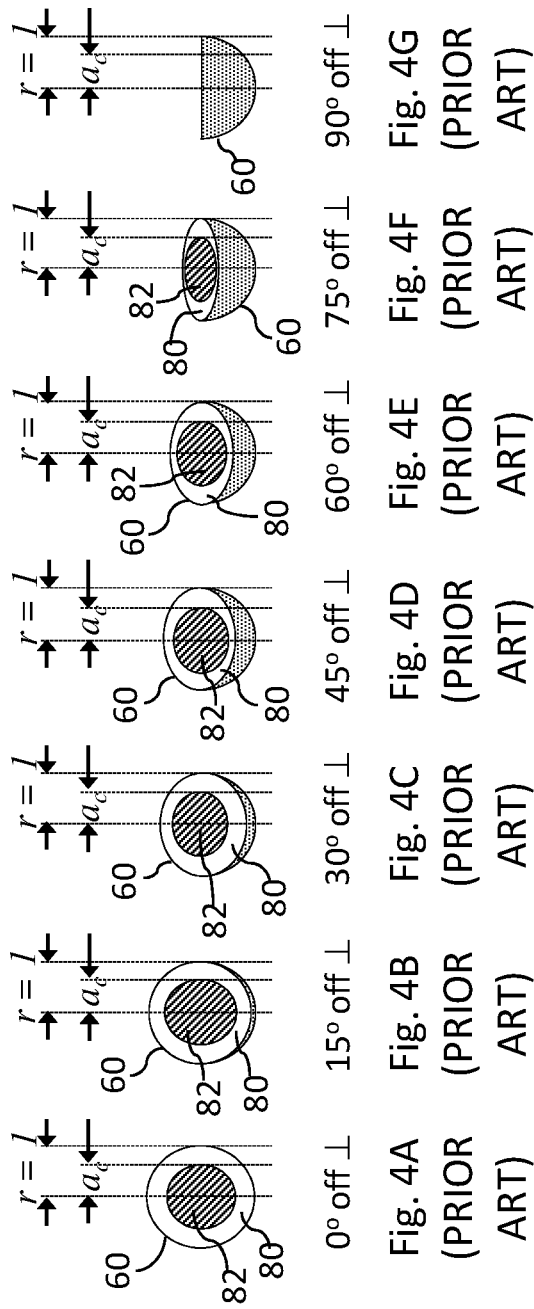

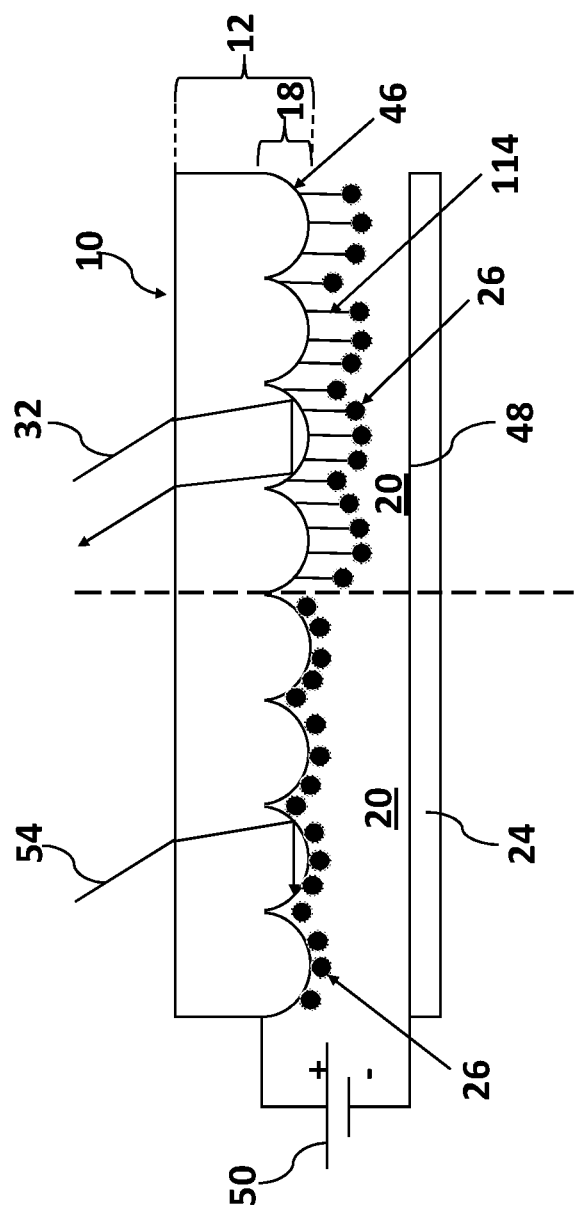

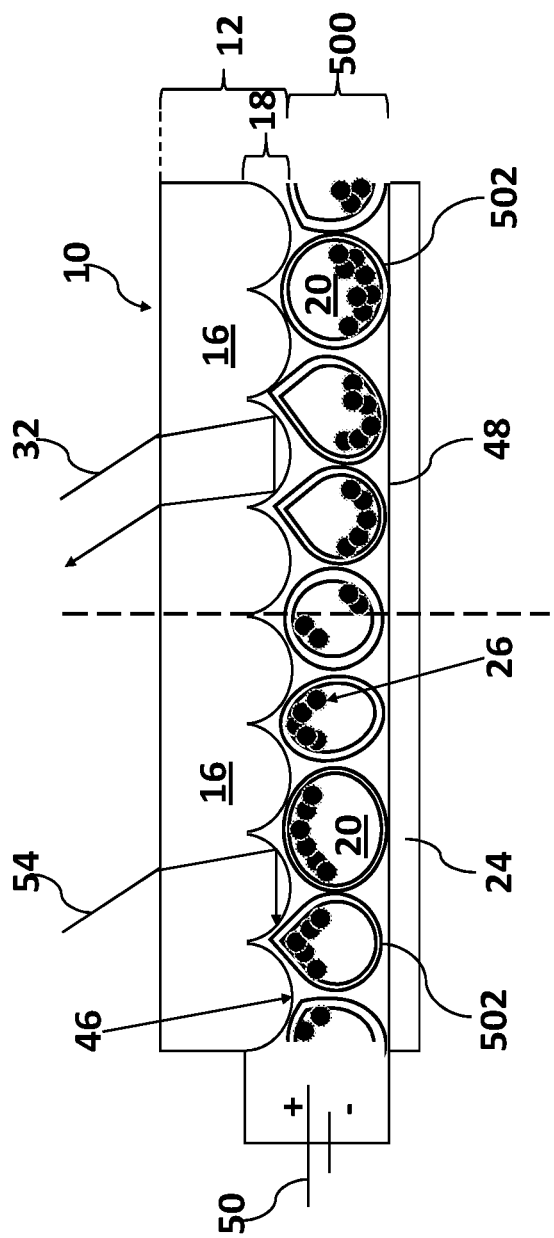

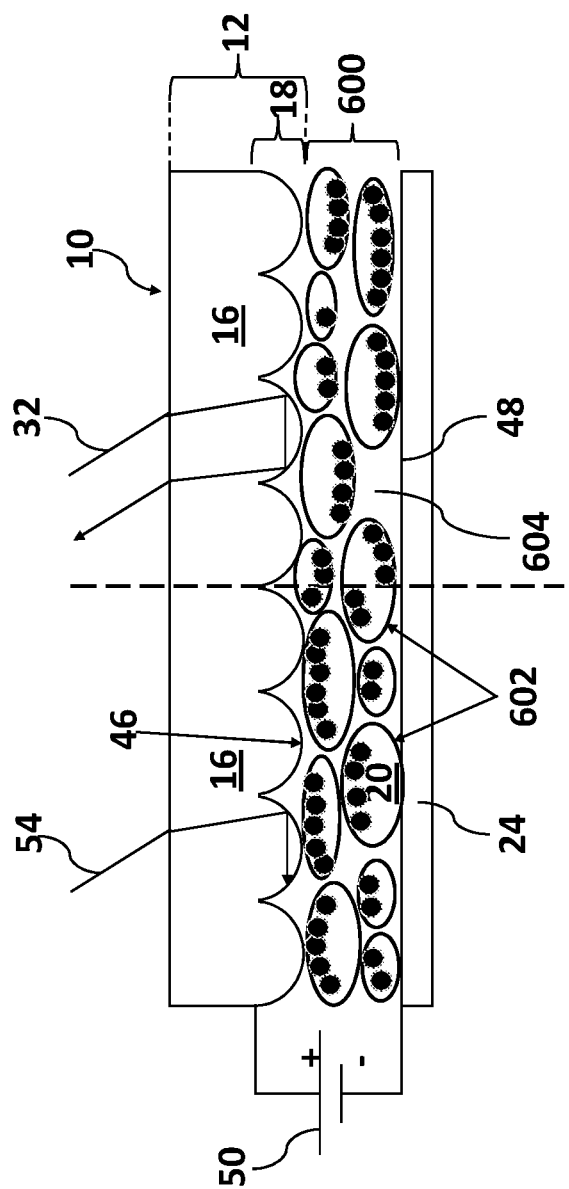

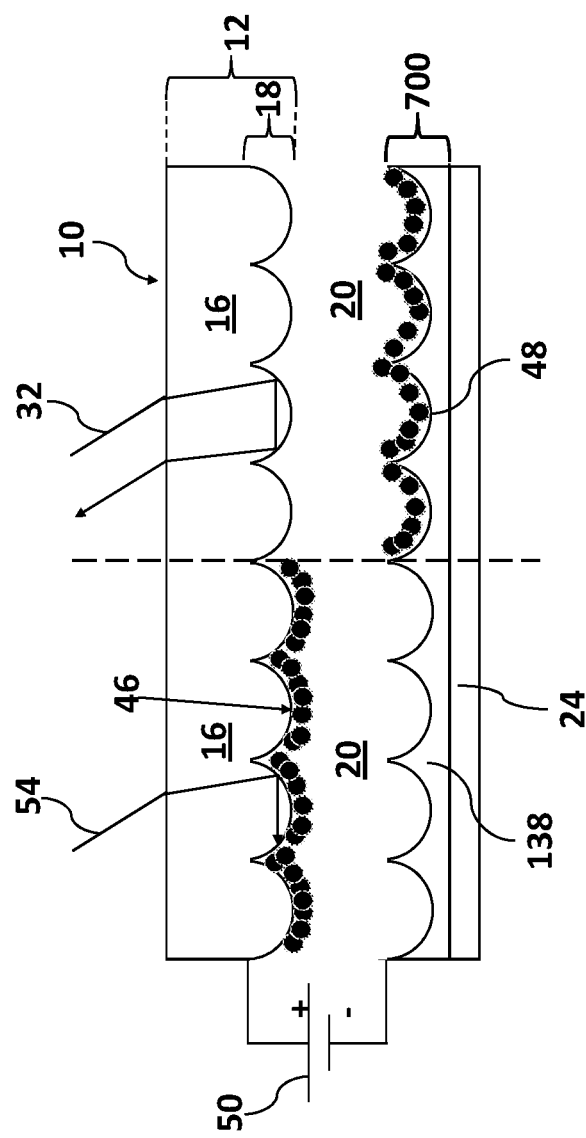

TIR-MODULATED WIDE VIEWING ANGLE DISPLAY

TECHNICAL FIELD

The instant application is the National Phase application of, and claims priority to, PCT Application Serial No. PCT/US2013/049606 (filed Jul. 8, 2013) which is incorporated herein in its entirety. This disclosure pertains to frustration of TIR in high brightness, wide viewing angle displays of the type described in U.S. Pat. Nos. 6,885,496; 6,891,658; 7,286,280; 7,760,417 and 8,040,591; all of which are incorporated herein by reference.

BACKGROUND

FIG. 1A depicts a portion of a prior art reflective (i.e. front-lit) frustrated total internal reflection (TIR) modulated display 10 of the type described in U.S. Pat. Nos. 6,885,496; 6,891,658; 7,286,280; 7,760,417 and 8,040,591. These patents describe an entirely new design of the outward sheet that was previously described in U.S. Pat. Nos. 5,959,777; 5,999,307; 6,064,784; 6,215,920; 6,304,365; 6,384,979; 6,437,921; 6,452,734 and 6,574,025 which comprised of, for example, various spatially uniform prism structures, dielectric light fibers, parallel, and perpendicular and interleaved structures. As a result of the new closely packed, high refractive index, spherical or hemispherical beaded, outward sheet design first described in patents '496' and '658', the practical angular viewing range of frustrated TIR or other reflective display methods was increased. The new design offers semi retro-reflective gain, whereby light rays which are incident on the hemispherical beaded surface are reflected back (but not exactly retro-reflected) toward the light source; which means that the reflection is enhanced when the light source is overhead and slightly behind the viewer, and that the reflected light has a diffuse characteristic giving it a white appearance, which is desirable in reflective display applications.

Display 10 includes a transparent outward sheet 12 formed by partially embedding a large plurality of high refractive index (e.g. $\eta_1 > \sim 1.90$) transparent spherical or approximately spherical beads (it is noted that said spherical or approximately spherical beads may also be referred to herein as "hemispherical beads" or "hemi-beads" or "beads") 14 in the inward surface of a high refractive index (e.g. $\eta_2 \approx \eta_1$) polymeric material 16 having a flat outward viewing surface 17 which viewer V observes through an angular range of viewing directions Y. The "inward" and "outward" directions are indicated by double-headed arrow Z. Beads 14 are packed closely together to form an inwardly projecting monolayer 18 having a thickness approximately equal to the diameter of one of beads 14. Ideally, each one of beads 14 touches all of the beads immediately adjacent to that one bead. Minimal interstitial gaps (ideally, no gaps) remain between adjacent beads.

An electro-active TIR-frustrating medium 20 is maintained adjacent the portions of beads 14 which protrude inwardly from material 16 by containment of medium 20 within a reservoir 22 defined by lower sheet 24. An inert, low refractive index (i.e. less than about 1.35), low viscosity, electrically insulating liquid such as Fluorinert™ perfluorinated hydrocarbon liquid ($\eta_3 \sim 1.27$) available from 3M, St. Paul, Minn. is a suitable fluid for the medium 20. Other liquids such as Novec™ also available from 3M can also be used as the fluid for medium 20. A bead:liquid TIR interface is thus formed. Medium 20 contains a finely dispersed suspension of light scattering and/or absorptive particles 26 such as pigments, dyes, dyed or otherwise scattering/absorptive silica or latex particles, etc. Sheet 24's optical characteristics are relatively unimportant: sheet 24 need only form a reservoir for containment of electro-active TIR-frustrating medium 20 and particles 26, and serve as a support for backplane electrode 48.

As is well known, the TIR interface between two media having different refractive indices is characterized by a critical angle $\theta_c$. Light rays incident upon the interface at angles less than $\theta_c$, are transmitted through the interface. Light rays incident upon the interface at angles greater than $\theta_c$ undergo TIR at the interface. A small critical angle is preferred at the TIR interface since this affords a large range of angles over which TIR may occur.

In the absence of TIR-frustrating activity, as is illustrated to the right of dashed line 28 in FIG. 1A, a substantial fraction of the light rays passing through sheet 12 and beads 14 undergoes TIR at the inward side of beads 14. For example, incident light rays 30, 32 are refracted through material 16 and beads 14. The rays undergo TIR two or more times at the bead:liquid TIR interface, as indicated at points 34, 36 in the case of ray 30; and indicated at points 38, 40 in the case of ray 32. The totally internally reflected rays are then refracted back through beads 14 and material 16 and emerge as rays 42, 44 respectively, achieving a "white" appearance in each reflection region or pixel.

A voltage can be applied across medium 20 via electrodes 46, 48 (shown as dashed lines) which can for example be applied by vapour-deposition to the inwardly protruding surface portion of beads 14 and to the outward surface of sheet 24. Electrode 46 is transparent and substantially thin to minimize its interference with light rays at the bead:liquid TIR interface. Backplane electrode 48 need not be transparent. If TIR-frustrating medium 20 is activated by actuating voltage source 50 to apply a voltage between electrodes 46, 48 as illustrated to the left of dashed line 28, suspended particles 26 are electrophoretically moved into the region where the evanescent wave is relatively intense (i.e. within 0.25 micron of the inward surfaces of inwardly protruding beads 14, or closer). When electrophoretically moved as aforesaid, particles 26 scatter or absorb light, thus frustrating or modulating TIR by modifying the imaginary and possibly the real component of the effective refractive index at the bead:liquid TIR interface. This is illustrated by light rays 52, 54 which are scattered and/or absorbed as they strike particles 26 inside the thin (~0.5 μm) evanescent wave region at the bead:liquid TIR interface, as indicated at 56, 58 respectively, thus achieving a "dark" appearance in each TIR-frustrated non-reflective absorption region or pixel. Particles 26 need only be moved outside the thin evanescent wave region, by suitably actuating voltage source 50, in order to restore the TIR capability of the bead:liquid TIR interface and convert each "dark" non-reflective absorption region or pixel to a "white" reflection region or pixel.

As described above, the net optical characteristics of outward sheet 12 can be controlled by controlling the voltage applied across medium 20 via electrodes 46, 48. The electrodes can be segmented to electrophoretically control the particles suspended in the TIR frustrating, low refractive index medium 20 across separate regions or pixels of sheet 12, thus forming an image.

FIG. 2 depicts, in enlarged cross-section, an inward hemispherical or hemi-bead portion 60 of one of spherical beads 14. Hemi-bead 60 has a normalized radius r=1 and a refractive index $\eta_1$. A light ray 62 perpendicularly incident (through material 16) on hemi-bead 60 at a radial distance a from hemi-bead 60's centre C encounters the inward surface of hemi-bead 60 at an angle $\theta_1$ relative to radial axis 66. For purposes of this theoretically ideal discussion, it is assumed that material 16 has the same refractive index as hemi-bead 60 (i.e. $\eta_1=\eta_2$), so ray 62 passes from material 16 into hemi-bead 60 without refraction. Ray 62 is refracted at the inward surface of hemi-bead 60 and passes into TIR-frustrating medium 20 as ray 64 at an angle $\theta_2$ relative to radial axis 66.

Now consider incident light ray 68 which is perpendicularly incident (through material 16) on hemi-bead 60 at a distance $$a_c = \frac{\eta_3}{\eta_1}$$

from hemi-bead 60's centre C. Ray 68 encounters the inward surface of hemi-bead 60 at the critical angle $\theta_c$ (relative to radial axis 70), the minimum required angle for TIR to occur. Ray 68 is accordingly totally internally reflected, as ray 72, which again encounters the inward surface of hemi-bead 60 at the critical angle $\theta_c$. Ray 72 is accordingly totally internally reflected, as ray 74, which also encounters the inward surface of hemi-bead 60 at the critical angle $\theta_c$. Ray 74 is accordingly totally internally reflected, as ray 76, which passes perpendicularly through hemi-bead 60 into the embedded portion of bead 14 and into material 16. Ray 68 is thus reflected back as ray 76 in a direction approximately opposite that of incident ray 68.

All light rays which are incident on hemi-bead 60 at distances $a \geq a_c$ from hemi-bead 60's centre C are reflected back (but not exactly retro-reflected) toward the light source; which means that the reflection is enhanced when the light source is overhead and slightly behind the viewer, and that the reflected light has a diffuse characteristic giving it a white appearance, which is desirable in reflective display applications. FIGS. 3A, 3B and 3C depict three of hemi-bead 60's reflection modes. These and other modes coexist, but it is useful to discuss each mode separately.

In FIG. 3A, light rays incident within a range of distances $a_c < a \leq a_{13}$ undergo TIR twice (the 2-TIR mode) and the reflected rays diverge within a comparatively wide arc $\varphi_1$ centered on a direction opposite to the direction of the incident light rays. In FIG. 3B, light rays incident within a range of distances $a_1 < a \leq a_2$ undergo TIR three times (the 3-TIR mode) and the reflected rays diverge within a narrower arc $\varphi_2 < \varphi_4$ which is again centered on a direction opposite to the direction of the incident light rays. In FIG. 3C, light rays incident within a range of distances $a_2 < a \leq a_3$ undergo TIR four times (the 4-TIR mode) and the reflected rays diverge within a still narrower arc $\varphi_3 < \varphi_2$ also centered on a direction opposite to the direction of the incident light rays. Hemi-bead 60 thus has a "semi-retro-reflective," partially diffuse reflection characteristic, causing display 10 to have a diffuse appearance akin to that of paper.

Display 10 has relatively high apparent brightness, comparable to that of paper, when the dominant source of illumination is behind the viewer, within a small angular range. This is illustrated in FIG. 1B which depicts the wide angular range $\alpha$ over which viewer V is able to view display 10, and the angle $\beta$ which is the angular deviation of illumination source S relative to the location of viewer V. Display's 10's high apparent brightness is maintained as long as $\beta$ is not too large. At normal incidence, the reflectance R of hemi-bead 60 (i.e. the fraction of light rays incident on hemi-bead 60 that reflect by TIR) is given by equation (1):

$$R = 1 - \left(\frac{\eta_3}{\eta_1}\right)^2 \quad (1)$$

where $\eta_1$ is the refractive index of hemi-bead 60 and $\eta_3$ is the refractive index of the medium adjacent the surface of hemi-bead 60 at which TIR occurs. Thus, if hemi-bead 60 is formed of a lower refractive index material such as polycarbonate ($\eta_1 \sim 1.59$) and if the adjacent medium is Fluorinert ($\eta_3 \sim 1.27$), a reflectance R of about 36% is attained, whereas if hemi-bead 60 is formed of a high refractive index nanocomposite material ($\eta_1 \sim 1.92$) a reflectance R of about 56% is attained. When illumination source S (FIG. 1B) is positioned behind viewer V's head, the apparent brightness of display 10 is further enhanced by the aforementioned semi-retro-reflective characteristic.

As shown in FIGS. 4A-4G, hemi-bead 60's reflectance is maintained over a broad range of incidence angles, thus enhancing display 10's wide angular viewing characteristic and its apparent brightness. For example, FIG. 4A shows hemi-bead 60 as seen from perpendicular incidence—that is, from an incidence angle offset 0° from the perpendicular. In this case, the portion 80 of hemi-bead 60 for which $a \geq a_c$ appears as an annulus. The annulus is depicted as white, corresponding to the fact that this is the region of hemi-bead 60 which reflects incident light rays by TIR, as aforesaid. The annulus surrounds a circular region 82 which is depicted as dark, corresponding to the fact that this is the non-reflective region of hemi-bead 60 within which incident rays are absorbed and do not undergo TIR. FIGS. 4B-4G show hemi-bead 60 as seen from incident angles which are respectively offset 15°, 30°, 45°, 60°, 75°. And 90° from the perpendicular. Comparison of FIGS. 4B-4G with FIG. 4A reveals that the observed area of reflective portion 80 of hemi-bead 60 for which $a \geq a_c$ decreases only gradually as the incidence angle increases. Even at near glancing incidence angles (e.g. FIG. 4F) an observer will still see a substantial part of reflective portion 80, thus giving display 10 a wide angular viewing range over which high apparent brightness is maintained.

Display 10 can exhibit undesirable clustering of particles 26 over time. More particularly, particles 26 tend to form loose agglomerates within the TIR-frustrating medium 20, with the surrounding regions of TIR-frustrating medium 20 containing relatively few suspended particles 26. Such clustering of absorptive particles 26 can cause long-term deterioration of display 10's image quality and overall performance. This invention relates to improvements and modifications of display 10 design such as:
  a) Non-uniform distribution of the TIR frustrating, electrophoretically mobile particles on the surfaces of the hemispherical beads in the dark state of the system;
  b) Settling and clustering of the TIR-frustrating particles;
  c) Non-uniformity of the electric field between the electrodes; and This invention also provides a modified system whereas the dark state depends on the light scattering or absorptive properties of the TIR-frustrating particles within the suspending fluid and not on frustration of TIR.

The foregoing examples of the related art and limitations related thereto are intended to be illustrative and not exclusive. Other limitations of the related art will become apparent to those of skill in the art upon a reading of the specification and a study of the drawings.

BRIEF DESCRIPTION OF DRAWINGS

Exemplary embodiments are illustrated in referenced figures of the drawings. It is intended that the embodiments and figures disclosed herein are to be considered illustrative rather than restrictive.

FIGS. 4A, 4B, 4C, 4D, 4E, 4F and 4G depict the FIG. 2 hemi-bead, as seen from viewing angles which are offset 0°, 15°, 30°, 45°, 60°, 75° and 90° respectively from the perpendicular.

FIG. 7 is a greatly enlarged, not to scale, fragmented cross-sectional side elevation view, of a portion of a TIR frustrated or modulated prior art reflective image display with tethered particles in the light (non-frustrated) and dark (frustrated) state.

FIG. 9 is a greatly enlarged, not to scale, fragmented cross-sectional side elevation view, of a portion of a TIR frustrated or modulated prior art reflective image display containing a plurality of capsules.

FIG. 10 is a greatly enlarged, not to scale, fragmented cross-sectional side elevation view, of a portion of a TIR frustrated or modulated prior art reflective image display containing a plurality of droplets surrounded by a polymer-based continuous phase.

FIG. 11 is a greatly enlarged, not to scale, fragmented cross-sectional side elevation view, of a portion of a TIR frustrated or modulated prior art reflective image display containing a conforming backplane.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

The present invention has numerous different aspects. Although these various aspects will for convenience and ease of understanding be described seriatim, it will readily be apparent to those skilled in the technology of electrophoretic displays that several aspects of the present invention may be incorporated into a single device. For example, an encapsulated device could also make use of the viscosity modifier, polymer coated particles and high volume fraction aspects of the invention.

Also, in view of the large number of aspects of the present invention, it is convenient to group the various aspects according to which of the aforementioned problems they are primarily designed to address, as follows:

Section A: Non-Uniform Distribution of Particles

Figure 1:
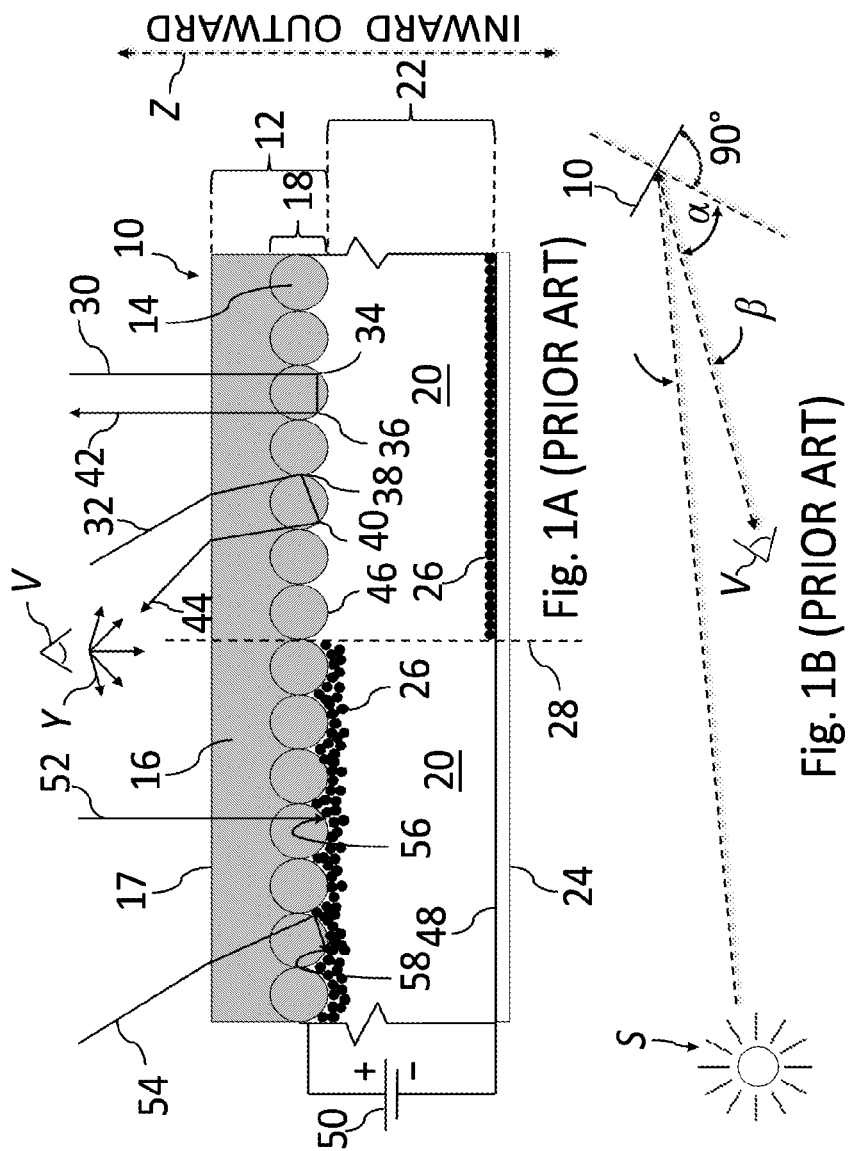
FIG. 1A is a greatly enlarged, not to scale, fragmented cross-sectional side elevation view, of a portion of a TIR frustrated or modulated prior art reflective image display.
FIG. 1B schematically illustrates the wide angle viewing range α of the FIG. 1A display, and the angular range β of the illumination source.
Figure 2:
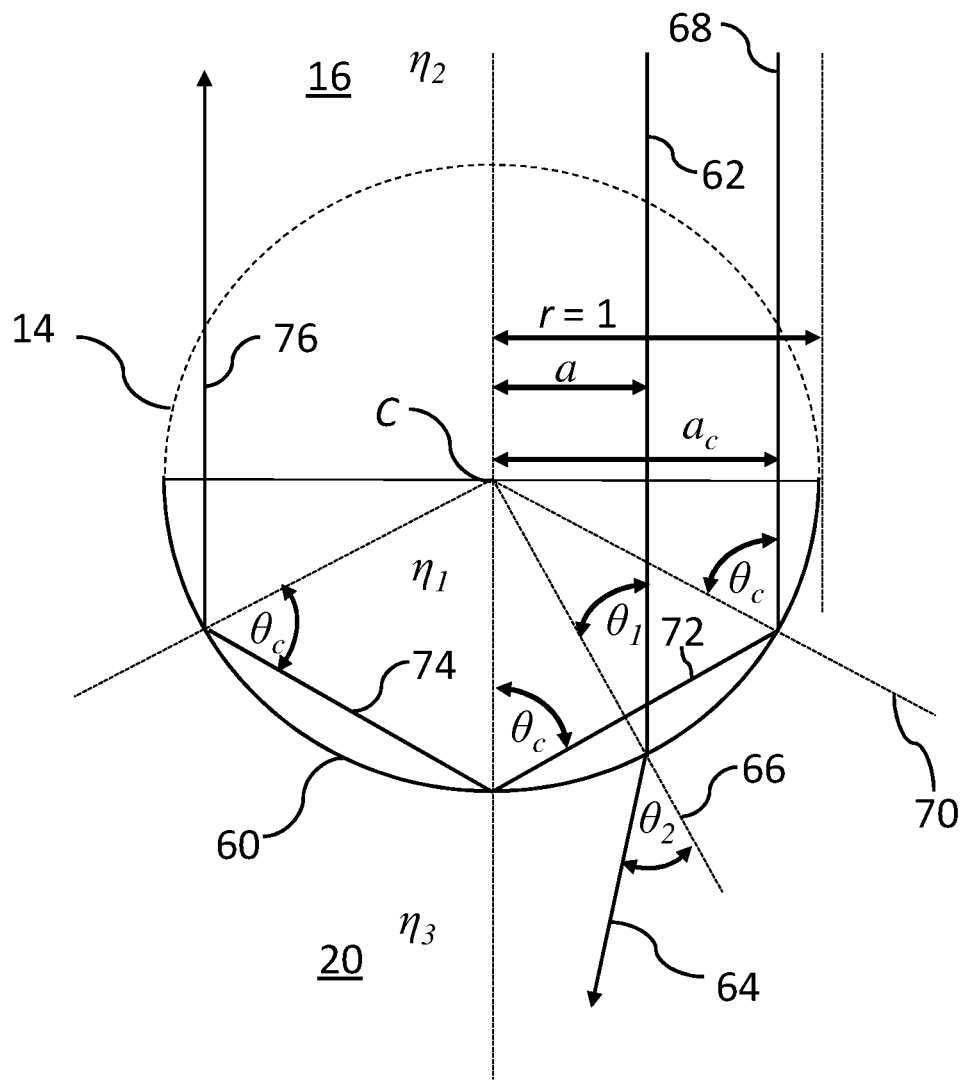
FIG. 2 is a greatly enlarged, cross-sectional side elevation view of a hemispherical ("hemi-bead") portion of one of the spherical beads of the FIG. 1A apparatus.
Figures 3A, 3B, 3C:
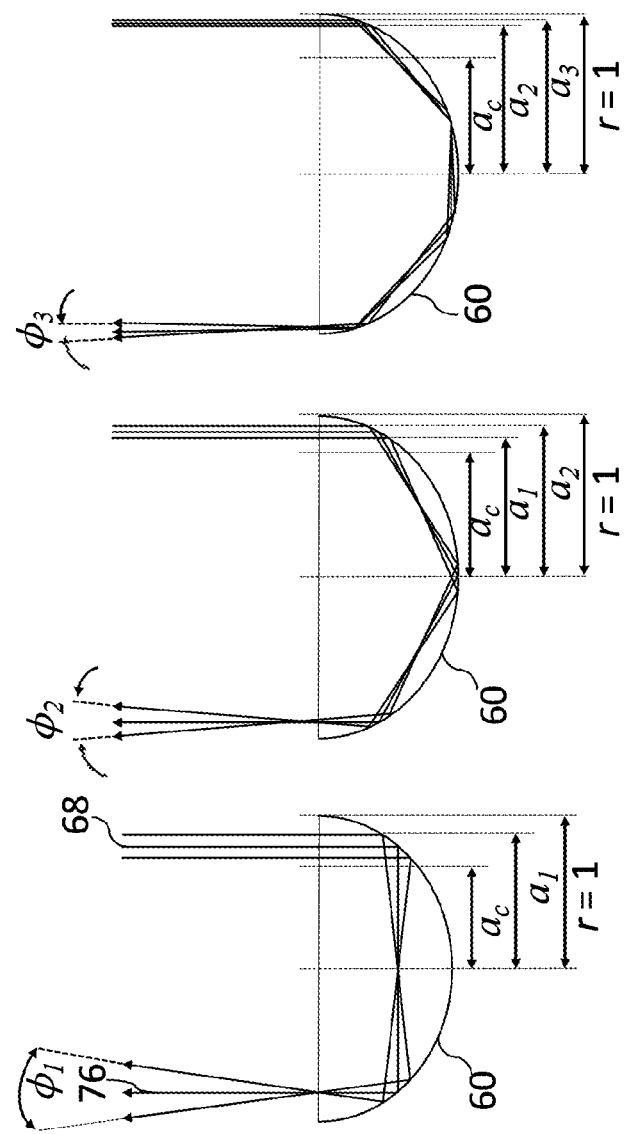
FIGS. 3A, 3B and 3C depict semi-retro-reflection of light rays perpendicularly incident on the FIG. 2 hemi-bead at increasing off-axis distances at which the incident rays undergo TIR two, three and four times respectively.
Figure 5:
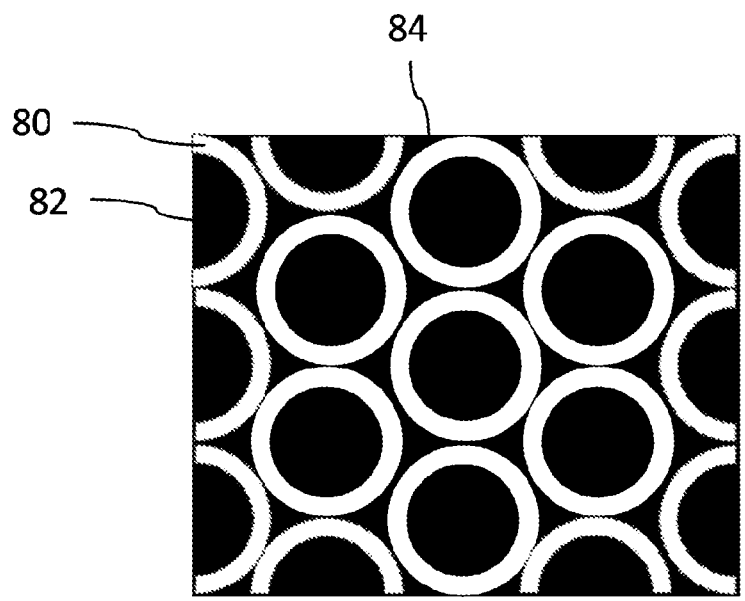
FIG. 5 is a top plan (i.e. as seen from a viewing angle offset 0° from the perpendicular) cross-sectional view of a portion of the FIG. 1A display, showing the spherical beads arranged in a hexagonal closest packed (HCP) structure.
Figure 6A:
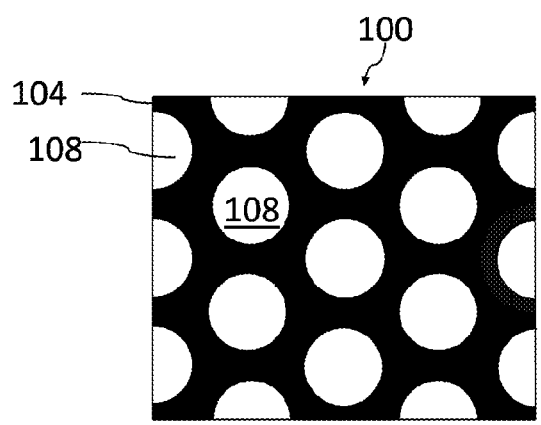
FIGS. 6A and 6B are top plan views, on a greatly enlarged scale, of two alternative backplane electrode patterns for use with the FIG. 5 structure.
Figure 6B:
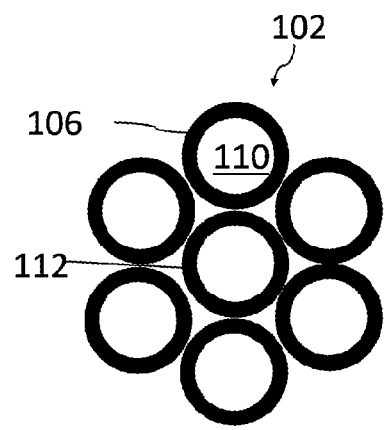

In FIG. 1A, a transparent outward sheet formed by partially embedding a large plurality of high refractive index, transparent spherical or approximately spherical beads in the inward surface of a high refractive index polymeric material having a flat outward viewing surface by which a viewer observes through an angular range of viewing directions. The spherical beads are packed closely together to form an inwardly projecting monolayer having a thickness approximately equal to the diameter of one of beads. Ideally, each one of beads touches all of the beads immediately adjacent to that one bead in a hexagonal closest packed (HCP) arrangement as illustrated in FIG. 5, but can also be arranged in a random-like fashion. Minimal interstitial gaps (ideally, no gaps) remain between adjacent beads. Said arrangement of beads is covered by a transparent conductive layer 46 such as indium tin oxide (ITO—other conductive materials, including conductive polymers may alternatively be used such as Baytron™). The rear electrode also shown in FIG. 1A is provided on a planar surface lying parallel to the outward surface of the reflective sheet. Thus, the distance between the two electrodes varies cyclically, in a wave-like manner, as one traverses the surface of the spherical beads.

As readily be apparent to those skilled in the technology of image display systems, the cyclic variation in the distance between the channel and rear electrodes causes the electric field between these two electrodes to be non-uniform, and this non-uniform electric field is likely to lead to substantially non-uniform distribution of particles on the walls of the beads in the "dark" state in which TIR is intended to be frustrated. This non-uniform distribution may cause parts of the beaded electrode not to be covered by particles, so that TIR does not occur at these non-covered parts, leading to an undesirably high dark state reflectance. Accordingly, if the particle distribution could be made uniform, the contrast ratio between the dark and light states of the display could be improved.

It is believed (although the present invention is in no way limited by this belief) that when an electric field is applied across the electrodes to move the light absorbing, TIR-frustrating particles adjacent the beaded electrode, said particles will initially concentrate on the areas of maximum field intensity along the non-uniform surface of the beads, and that thereafter, as the electric field continues to be applied, the particles will tend to spread from these areas of maximum field intensity to areas of lower field intensity. Accordingly, using light absorbing particles with a range of electrophoretic mobilities, in accordance with the variable electrophoretic mobility aspect of the present invention, should improve the uniformity of distribution of the particles in the dark state, since the more mobile particles will already have traveled to the areas of maximum field intensity as the less mobile particles are still reaching the areas of maximum field intensity. The electrophoretic mobilities of the particles may vary from about a two-fold to about a five-fold, or higher range, i.e., at least one of the particles should have an electrophoretic mobility which is at least about twice, and preferably at least about five times, that of another of the particles. Also, with or without using such a range of mobilities, it is important to control the duration of the period during which the electric field is applied to the electrodes (the duration of the "driving pulse") since too short a pulse will tend to leave the particles concentrated on the areas of maximum field intensity, whereas too long a pulse will allow most particles to move into the "valleys" (the points furthest distant from the rear electrode) between the beads, in either case producing an undesirably non-uniform coverage of the beaded surface. It is also advantageous to use light absorbing particles with high charges since such highly charged particles, when in close proximity to one another on the surface of the beaded electrode, will coulombically repel one another, and will thus tend to more uniformly distribute themselves over the beaded electrode and frustrate TIR.

Another technique to increase the uniformity of particle distribution in the dark and light states and to prevent lateral migration of the particles is to physically tether the particles to the beaded electrode. Image display systems may usefully be modified by tethering light absorbing, TIR-frustrating particles to each other or to a fixed electrode using polymeric chains or similar tethers. The use of such tethers with larger light absorbing particles in TIR-based reflective display systems is practicable because of the very short distance which the particles need to move between the dark and light states. Because frustration of TIR relies upon the particles disrupting the evanescent wave, which penetrates only about 100-250 nm beyond the surface at which the reflection is notionally taking place, particle movement of about 500 nm is sufficient to cause a shift between the light and dark states of the system, and movements of this magnitude are practicable with tethered particles. If tethered particles are used, close attention should be paid to the fluid in which the light absorbing, TIR frustrating particles are suspended in, since 9alvation of the tether is an important factor in controlling the conformation of the tether and hence the movement of the tethered particle relative to the electrode, and the degree of 9alvation can be greatly affected by the composition of the suspending fluid.

A schematic cross-section through a tethered particles image display device of the present invention is shown in FIG. 7. This device comprises a reflecting sheet (better described as a light transmitting member) 12 having a planar outward surface (the top surface as illustrated in FIG. 7; in actual use, this outward surface typically lies in a vertical plane, so that the plane of FIG. 7 is horizontal) through which an observer views the display. The reflecting sheet 12 has an inward surface having the form of a series of spherical or hemispherical beads 18 (in FIG. 7 the hemispherical bead structure is depicted), which form a wave-like surface structure. Between the electrodes 46 and 48 is disposed a fluidic medium 20 having a refractive index which is sufficiently smaller than the refractive index of the reflecting sheet 12 to permit the TIR's previously mentioned to take place. Suspended within the fluidic medium 20 are a plurality of electrically charged particles 26, each of which is connected to the front electrode 46 by an individual flexible filament or tether 114. The tethers 114 can vary in length, and the number of particles 26 is greatly reduced in FIG. 7 for ease of comprehension; in practice, the number of particles 26 is made somewhat greater than that required to form a continuous layer covering the front electrode 46 in order to ensure that when an electric field is applied to bring the particles 26 adjacent the front electrode 46, substantial complete coverage of the electrode 46 by the particles 26 will be achieved, since even a small area of the electrode 46 not covered by the particles 26 can have a substantial adverse effect on the dark state, and hence the contrast ratio, of the display 10.

FIG. 7 illustrates state of the display 10 to the right of the dotted line 28, in which light incident on the outward surface of the reflecting sheet 12 undergoes a double TIR and is returned out through the outward surface in the manner already described. If, however, an electric field of appropriate polarity is applied between the electrodes 46 and 48, the particles 26 will move closely adjacent the front electrode 46 to create a dark state as shown to the left of the dotted line (note that the tethers in the dark state have been removed from FIG. 7 for clarity but are assumed to be present). The particles 26 are chosen to have a refractive index greater than that of the fluid medium 20, such that when the particles lie closely adjacent the front electrode 46, TIR is disrupted, and light incident on the outward surface of the reflecting sheet 12 is no longer returned out through the outward surface, so that the device 10 appears dark.

The limited movement needed to switch between the light and dark states in the beaded outward sheet system also has interesting implications as regards the design of electrophoretically mobile particles to be used in these systems. As a first approximation, the layer of light absorbing, TIR frustrating particles covering the beaded electrode in the dark state of such a system may be modeled as a two-dimensional close-packed array of spheres formed on a flat surface. Such a close-packed array leaves voids immediately adjacent the surface, these voids having a form similar to that of a frustum of a triangular pyramid, with the height of this frustum equal to the radius of the spheres. If this radius is significantly larger than the distance by which the evanescent wave penetrates the flat surface, a proportion of the evanescent wavefront will lie within the voids and hence with not be disrupted by the particles, and the same proportion of the light striking the surface will undergo TIR. (It is of course appreciated that the intensity of the evanescent wave decreases exponentially with distance from the surface so that there is, strictly speaking, no wavefront at a specific distance from the surface. Nevertheless, for present qualitative purposes, it is convenient to consider an evanescent wavefront extending parallel to the beaded wave-like surface at a distance such that the intensity of the wave at the wavefront is some arbitrary fraction, say 1/e, of its intensity at the surface.) Accordingly, the diameter of the particles will affect the proportion of the TIR which is frustrated. In general, it appears that for spherical particles, a diameter of about 200-300 nm (in accordance with one part of the controlled shape particles aspect of the present invention) should be most successful in frustrating TIR.

However, in accordance with another part of the controlled shape particles aspect of the present invention, and from the foregoing discussion, it also appears that spherical or near spherical particles are not the optimum shape for frustrating TIR. Essentially, the ideal situation for disrupting the evanescent wave, and thus frustrating TIR, is to form a continuous layer of material at the evanescent wavefront. While it may be impossible to satisfy this condition in practice, to approach as closely as possible to this condition requires that there be as few gaps as possible in the layer of particles at the relevant distance. To the extent that small particles can assist in filling voids between larger particles, use of a mixture of electrophoretically mobile TIR frustrating particles of differing sizes may be advantageous in leaving as few voids as possible. However, formation of an almost-continuous layer is best achieved by using particles which have substantially greater dimensions in directions parallel to the surface than perpendicular to it. Accordingly, using particles in the form of flat plates or prisms or oblate ellipsoids or spheroids should give better frustration of TIR than using spherical particles. The flat plates or prisms desirably have an aspect ratio (the ratio of average diameter to thickness) of at least about 3:1. Specifically, aluminum flakes having an aspect ratio of about 10:1 and an effective major diameter of about 5-15 μm are available commercially and should be very suitable for use in the beaded outward sheet systems. Similar flakes of other metals may also be employed. Other types of high aspect ratio particles may be employed such as nacreous pigments, pearlescent pigments and other high aspect ratio "effect" pigments.

In beaded outward sheet TIR systems, the structure of the beaded surface, and particularly the optical properties thereof, are of crucial importance in promoting effective frustration of TIR and hence good contrast between the light and dark states of the system. For example, the beaded surface could use a conducting polymer as the electrode in place of indium tin oxide (ITO). Alternatively, in accordance with the low refractive index layer aspect of the present invention, the optical properties of the beaded surface might be modified by using a layer of ITO (or similar conductive material) which is thicker than that required to form a sufficiently conductive electrode, or by coating a low refractive index material, such as magnesium fluoride over the ITO. Note that the use of a low refractive index, or indeed other material over the electrode in this manner may be useful in increasing the range of materials which can be used to form the electrodes. Because of the very low refractive index which is required of the liquid medium with suspended TIR frustrating particles in the beaded TIR systems, a good candidate for the choice of said medium is restricted to highly fluorinated liquids. Certain conductive materials otherwise suitable for use as electrodes in the beaded TIR systems, especially certain conductive polymers, may be adversely affected by long term contact with such highly fluorinated liquids. Covering the electrode with a layer of non-conducting material widens the range of conductive materials which can be used with such liquids. The current required to switch a beaded TIR system is sufficiently low that the presence of a thin layer of a material normally regarded as an insulator over one or both of the electrodes does not have a substantial impact on the operation of the system.

Figure 8:
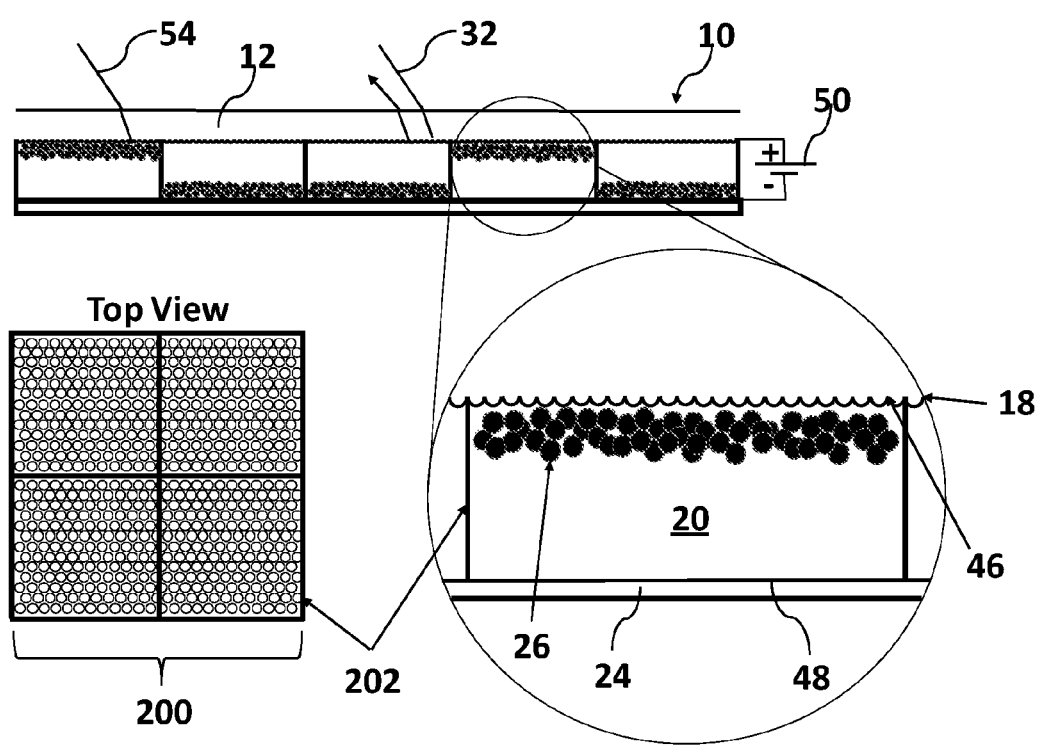
FIG. 8 is a greatly enlarged, not to scale, fragmented cross-sectional side elevation view, of a portion of a TIR frustrated or modulated prior art reflective image display with the TIR-frustrating, electrophoretically mobile particles confined to a square-like shaped micro-cells. A top view of an array of micro-cells and an enlarged view of a single micro-cell is shown.

Another technique to increase the uniformity of particle distribution and to prevent lateral migration of particles is to isolate and corral the plurality of particles contained within the liquid medium into individual compartments. The individual compartments are comprised of walls at regular intervals that can be organized in such a way as to form a macroscopic pattern from a plurality of micro-cells (these may also be referred to as "micro-wells") each of which comprise a low refractive index medium, light absorbing, TIR frustrating particles and any other desired performance enhancing additives. Said macroscopic pattern of micro-cells may comprise a plurality of circle, triangle, square, pentagonal or hexagonal-like walled structures. In one particular embodiment, a schematic cross-section through an image display device of the present invention is shown in FIG. 8, wherein the particles are isolated in a macroscopic array of square-like walled micro-cells. This device designated 10 has a reflecting sheet 12, a support member 24 and electrodes 46 and 48 all of which are identical to the corresponding integers shown in FIG. 1. The light state where the particles are attracted to the rear electrode and away from the beaded front sheet and dark state where the particles are attracted to the beaded front electrode into the evanescent wave region and frustration of TIR of the display are both shown in FIG. 8. A plurality of micro-cells are arrayed in an organized macroscopic arrangement of squares denoted 200 and formed from walls 202. A top view is also shown in FIG. 8 illustrating the side-by-side macroscopic arrangement of micro-cells. The walls of the micro-cells can either be full walls that bridge the rear and front planes and completely encapsulate the liquid medium (as shown in FIG. 8) comprising the light absorbing, TIR frustrating particles or partial walls that do not bridge the rear and front planes completely but enough to slow or prevent migration of particles. The walls may be composed of a polymer material and can be formed into a plurality of wells by numerous techniques such as, but not limited to, molding, pressing, embossing or chemical and physical etching via patterning of a photoresist layer. Other techniques and embodiments for providing an array of micro-cells of the inventions described above will readily be apparent to those skilled in the relevant art.

Another technique to increase the uniformity of particle distribution and to prevent lateral migration of particles is to isolate and corral the plurality of particles contained within the liquid medium by encapsulating the particles 26 and low refractive index medium 20 within a plurality of microcapsules in a beaded outward sheet TIR system 10 described, herein. Microcapsules with flexible walls have an advantage when used in a beaded front plane TIR system as opposed to rigid microcapsules. Flexible microcapsules can fill the crevices and voids between the beads on the contoured inward side of the outward sheet electrode surface to resolve optical requirements for TIR displays.

In a beaded outward sheet system using microcapsules, the region lying between the beaded outward sheet electrode and flat rear electrode will be lined with a conforming film of the microcapsule wall material, and obviously the electrophoretically mobile TIR frustrating particles at all times remain separated from the beaded front and planar rear electrodes by the thickness of the microcapsule wall. It is necessary to ensure the particles in contact with the internal surface of the microcapsule wall are sufficiently close to the beaded surface to disrupt the evanescent wave (allowing, of course, for the effect of the refractive index of the microcapsule wall material on the depth of penetration of the evanescent wave) and thus frustrate TIR. There are two approaches to this problem, which may be used separately or in combination. The first approach is to use a microcapsule wall material which has a refractive index which does not differ from the refractive index of the reflective sheet by more than about 0.3, and preferably not more than about 0.2; for example, certain methacrylate polymers have refractive indices within the desired range. In this case, the microcapsule becomes, optically, part of the material forming the beads, and the interface at which TIR occurs is that between the microcapsule wall and the low refractive index medium, and the TIR frustrating particles can thus lie immediately adjacent this interface. The second approach uses a very thin microcapsule wall (less than 200, and preferably less than 100 nm) to ensure that the evanescent wave penetrates into the low refractive index liquid medium. It may also be desirable to increase the viscosity of the medium using a viscosity modifier, and the preferred viscosity modifiers for this purpose are the same as those described below for viscosity modifier devices of the present invention.

FIG. 9 of the accompanying drawings is a schematic cross-section through an encapsulated device of the present invention. This device designated 10 has a reflecting sheet 12, a support member 24 and electrodes 46 and 48 all of which are identical to the corresponding integers shown in FIG. 1. However, in the device 10 the low refractive index liquid medium 20 and the particles 26 are confined within a plurality of capsules (generally designated 500) each defined by a capsule wall 502. These capsule walls 502 are deformable, so that when the capsules are deposited upon the reflecting sheet 12 and the support 24 thereafter placed on top of the capsules 500 to form the complete device 10. The individual capsule walls 502 deform to substantially fill the space between the sheet 12 and the support 24, assuming the essentially wave-like, beaded surface structure form shown in FIG. 9.

Another approach to increase the uniformity of particle distribution and to prevent lateral migration of particles in beaded outward sheet TIR display systems described herein is to use a polymer-dispersed low refractive index liquid medium which comprises a discontinuous phase containing the liquid medium and light absorbing, electrophoretically-mobile, TIR frustrating particles and a continuous phase essentially free from such particles. The discontinuous phase is comprised of a plurality of droplets, each of which comprise a low refractive index medium and at least one particle disposed within the suspending fluid and capable of moving through the fluid upon application of an electric field, and the continuous phase surrounding and encapsulating the discontinuous phase, the discontinuous phase comprising at least about 40 percent by volume of the liquid medium comprising the electrophoretically mobile particles and any other additives. The continuous phase surrounds and encapsulates the discontinuous phase, thus providing a cohesive medium.

In the present polymer dispersed medium 600 shown in FIG. 10 lying between the beaded front plane 12 with electrode 46 and rear electrode 48, the discontinuous phase (droplets) may comprise from about 40 to about 95 percent by volume of the medium, but preferably comprises about 50 to about 80 percent by volume. The optimum proportion of droplets will of course vary with the specific materials employed, but will typically be in the range of about 60 to about 70 percent by volume. If the proportion of droplets is too high, the polymer dispersed 600 is mechanically weak and easily damaged, and droplets may leak from the medium upon rough handling. On the other hand, it is undesirable to use a proportion of continuous phase substantially larger than that required to provide mechanical strength to the medium. As is well-known to those knowledgeable concerning related electrophoretic displays, such displays normally comprise a thin layer of the electrophoretic medium between two electrodes, so that at any given operating voltage between the electrodes, the field applied to the electrophoretic medium is inversely proportional to its thickness. If excess continuous phase is used in the present medium, the thickness of the medium needed to provide a given amount of droplets will be unnecessarily increased, so that either the applied field will be reduced (and the switching time of the display thereby increased) or the operating voltage must be increased, either of which is undesirable. An unnecessarily excessive amount of continuous phase will also likely increase the distance of a droplet comprising the electrophoretically mobile TIR, frustrating particles and low refractive index medium from the beaded surface which will have a negative effect on the ability to frustrate TIR.

The droplets may comprise a single type of particle disposed in a low refractive index medium, or two or more types of particles, differing in electrophoretic mobility. The electrophoretically mobile, TIR-frustrating particles may comprise, but not limited to, carbon black. The low refractive index medium may comprise, but not limited to, Fluorinert™ FC-770, FC-43, FC-75, Novec™ 649 or 7500. The droplets are about less than 20 μm in thickness, and the medium comprising the discontinuous droplets and continuous film-forming phase may have a thickness of 50 μm to up to about 200 μm.

As already indicated, the medium 600 of the present invention is prepared by dispersing the droplets in a liquid medium containing a film-forming material, and then subjecting the liquid medium to conditions effective to cause the film-forming material to form a film and thus produce the two-phase polymer dispersed medium in which the film-forming material forms the continuous phase and the droplets for the discontinuous phase. The initial dispersion or emulsification of the droplets in the liquid medium may be effected by any of a variety of conventional techniques, for example rapid stirring of a mixture of the liquid medium and the material which will form the droplets, or sonication of such a mixture. Devices suitable for forming the droplets also include, but are not limited to, blade mixers, rotor-stator mixers and colloid mills, devices in which a liquid stream is pumped at high pressures through an orifice or interaction chamber (such as the Microfluidizer sold by Microfluidics), sonicators, Gaulin mills, homogenizers, blenders, etc. The dispersion or emulsification may also be effected by shearing, using a colloid mill or similar apparatus. It should, however, be noted that the presence of the TIR frustrating particles within the droplets tends to make a dispersion or emulsion of such droplets less stable than a similar emulsion or dispersion of the same materials in which the droplets do not contain solid particles, and hence in the present process it is preferred to use a liquid medium which can solidify rapidly.

The continuous phase which is also referred to as the film-forming material will be organic or bioorganic-based. It may be a gelatin, such as lime-processed gelatin, acid-processed pig gelatin or acid-processed ossein gelatin, or a modified gelatin such as acetylated gelatin, phthalated gelatin, oxidized gelatin, etc. Other film formers include water-soluble polymers and co-polymers including, but not limited to, poly(vinyl alcohol), partially hydrolyzed poly(vinyl acetate/vinyl alcohol), hydroxyethyl cellulose, poly(vinylpyrrolidone), and polyacrylamide. Copolymers of these with hydrophobic monomers, such as t-butyl acrylamide, or isopropyl acrylamide can also be used. Polymeric film formers that are also capable of gelation upon application of high or low temperature are particularly useful. Such materials include the various gelatins described above, cellulosic materials, and homopolymers or copolymers containing isopropyl acrylamide. Additional film formers that may be used are polymers soluble in hydrocarbon-based solvents such as, but not limited to, polyacrylates, polymethacrylates, polyamides, epoxys, silicones and polystyrene. The film forming materials mentioned herein may formed and cured using radiation (typically ultra-violet light-curable), cooling, drying, polymerization, cross-linking, sol-gel formation, and pressure-curing. After curing of the organic polymer film-forming material using the methods described, it will comprise of at least about 5 percent to about 15 percent by weight of the film 400 shown in FIG. 10. The thickness of the final film comprising the discontinuous and continuous phases is at least about 10 μm.

FIG. 10 of the accompanying drawings is a schematic cross-section through an encapsulated device of the present invention which further illustrates the invention. This device designated 10 has a reflecting sheet 12, a support member 24 and electrodes 46 and 48 all of which are identical to the corresponding integers shown in FIG. 1. However, in the device 10 the low refractive index medium 20 (The low refractive index medium may comprise, but not limited to, Fluorinert™ FC-770, FC-43, FC-75, Novec™ 649 or 7500) and the TIR frustrating particles 26 are confined within a plurality of discontinuous phase droplets (generally designated 400) surrounded by a continuous phase 604. These droplets 602 are deformable, so that when the medium 400 comprising the discontinuous droplet phase 602 and the surrounding continuous phase 604 are deposited upon the reflecting sheet 12 and the support 24 and then dried the individual droplets 602 deform and flatten as medium 400 contracts between the sheet 12 and the support 24, as shown in FIG. 9. As medium 400 contracts upon drying and or curing the droplets flatten and become closer to the beaded front plant 12, close enough such that when the dark state is created upon application of an electric field the particles in the droplets are attracted to the beaded front electrode surface into the evanescent wave region and frustrates TIR.

Section B: Settling of Particles

One problem which the beaded outward sheet system described herein 10, shares with many other prior image display systems comprising particles is settling of the TIR frustrating particles under gravity so that after long usage the particles occupy and drift to various locations of the space between the front and rear electrodes leading to an uneven distribution of the particles throughout the low refractive index liquid medium. Note that since, in the beaded outward sheet system, particles are free to move between beads as they are moved from the beaded front electrode to the rear electrode, then in the reverse direction, the systems will suffer from particle settling if the region of the liquid medium 20 between the beaded front plane electrode and flat back electrode 48 lie at an angle to the horizontal, in most display applications it is impossible to keep the region horizontal when the display is in use.

A technique for dealing with the settling problem is to increase the viscosity of and/or gel the low refractive index fluid medium with the suspended TIR frustrating particles, for example by dissolving a polymer in the liquid medium. Although such an increase in viscosity will decrease the mobility of the particles, and hence the switching time (the time required to switch the display between its dark and light states) will be increased, a modest increase in switching time can be tolerated since the switching times of beaded outward sheet TIR systems can be made very low, because of the very short distances which the particles need to move between the light and dark states. Furthermore, if the viscosity modifier comprises a polymer having an intrinsic viscosity of η in the low refractive index medium and being substantially free from ionic or ionizable groups in the low refractive index medium, the polymer being present in the low refractive index is medium in a concentration of from about $0.5\eta^{-1}$ to about $2.0\eta^{-1}$, very substantial increases in the bistability of the device can be produced at the expense of only a modest increase in switching time. Polymers for use as a viscosity modifier may be, but not limited to, non-aromatic, fluorinated and perfluorinated polyolefins and polysiloxanes with number average molecular weights in excess of about 50,000 and more preferably in excess of about 100,000.

A further technique for reducing, or at least deferring, the effects of particle settling is to reduce the difference in density between the TIR frustrating, electrophoretically mobile particles and the low refractive index medium; this approach also widens the range of materials which can be used in such particles. The density of many types of TIR frustrating particles can be reduced by attaching polymer chains. For example, U.S. Pat. No. 6,215,920 recommends using either "dyed or otherwise scattering/absorptive silica particles" or "dyed or otherwise scattering/absorptive latex particles" in TIR systems, because of the low specific gravities of these materials (given as about 1.44 for silica and about 1.5 for latex particles) are tolerable for use with the low specific gravity, low viscosity fluorinated alkane, low refractive index liquid medium with which they are intended to be used. Carbon black may be suitable material for the light absorbing particles but the density of untreated carbon black may be too high to be useful in TIR systems described herein. By attaching polymer chains to the carbon black, its density could be reduced sufficiently to render it useful in such systems. It is recommended that the carbon black particles have from about 1. To about 25 percent by weight of the carbon black of the polymer chemically bonded to, or cross-linked around, the carbon black particles.

Attachment of polymer to the electrophoretically mobile, TIR frustrating particles has uses other than altering the density thereof. For example, such polymer attachment may be useful in increasing or decreasing the effective refractive index of the articles. A high refractive index particle may be useful for increasing optical coupling between the particle and the surface of the beaded front plane electrode, thus promoting efficient frustration of TIR, and for this purpose the polymer coating may contain repeating units derived from arsenic-containing monomers. If a low refractive index particle is desired, the polymer coating may contain repeating units derived from highly fluorinated monomers.

A different approach to the settling problem is to increase the volume fraction of the suspended particles in the low refractive index liquid medium described in U.S. Pat. No. 6,865,011 for TIR display systems comprised of an outward sheet with prism structures. As already noted, to frustrate TIR it is necessary for the particles to be within about 250 nm of the beaded front plane surface. Conversely, a spacing of 500 nm or greater between the beaded surface and the particles will permit full TIR. If the volume fraction of the particles in the low refractive index medium is increased above about 25 percent, and perhaps as high of about 75 percent (depending upon factors such as the size distribution and shape of the particles), the particles will be unable to undergo substantial settling, since they almost "fill" the liquid medium 20, but when an electric field of appropriate polarity to cause a "white" state of the display is applied between the electrodes, a narrow gap, conforming to the shape of the beaded surface, will be cleared of the electrophoretically mobile TIR frustrating particles, thus permitting TIR to occur. A dispersant such as, but not limited to, Krytox™ 157-FSL, Krytox™ 157-FSM or Krytox™ 157-FSH fluorinated oil (respectively having specified molecular weights of approximately 2500, 3500-4000 and 7000-7500, CAS Registry No. 860164-51-4, DuPont Performance Lubricants, Wilmington, Del. 19880-0023) is preferably added to the suspension to facilitate stable suspension of the particles in the low refractive index medium.

Section C: Non-Uniformity of Electric Field

One problem in beaded outward sheet TIR display systems is the non-uniformity of the electric field between the planar rear electrode and the non-planar, wave-like beaded front plane electrode surface. This problem is best overcome by making the rear electrode substantially conform to that of the beaded electrode so that a gap of substantially constant width (though having a wave-like form as seen in cross-section) remains between the electrodes. The electric field between such electrodes, except in the adjacent peaks, valleys and recesses of the contoured surface, will lie perpendicular to the electrode surfaces.

The shaping of the rear electrode can be effected in various ways. The material supporting the back electrode could be a polymer to provide the desired conforming shape of the rear electrode and coated with a conductor in the same way as for the beaded front plane electrode. To provide proper alignment between the two electrodes, it may be desirable to provide projections on one of the electrode-bearing sheets, with corresponding recesses on the other. Alternatively, the rear electrode itself could be shaped to provide the appropriate surface. For example, a layer of metal could be deposited on a substrate and shaped, possibly by electrochemical machining, to provide the necessary conforming surface shape of the rear electrode. A further possibility is shown in FIG. 11 of the accompanying drawings, which illustrates a system comprising a conforming rear support 700 and electrode 48. As shown in FIG. 11, this system (generally designated 10) has a reflecting sheet 12, a space comprising of the electrophoretically mobile, TIR frustrating particles and low refractive index liquid medium, a support member 24 and electrodes 46 and 48 all of which are identical to the corresponding integers shown in FIG. 1. The conforming backplane system 700 of the display system 10 closely conforms to the shape of the beaded front plane 18 so that only a thin layer of liquid medium 20 containing electrophoretically mobile particles 26 is present in the system. The beaded front plane outward sheet structure 12 and the conforming backplane structure 700 may preferably be registered with respect to each other but also may be slightly offset with respect to each other.

Instead of using a shaped backplane to control the movement of the particles in a beaded outward sheet TIR display system described herein, particle movement could be controlled by using a mixture of two immiscible liquids as the electrophoretically controlled medium. If the medium comprises two immiscible liquids, one of which wets the beaded electrode material and the other does not (it being assumed that the rear electrode is formed of a different material which is not wetted by the first liquid) and the proportions of the two liquids are adjusted appropriately, the "wetting" liquid will form a thin layer adjacent and conforming to the beaded electrode. The properties of the particles can be adjusted so that the particles have a lower free energy when dispersed in one of the liquids than in the other. Accordingly, the particles may only move within the layer of the wetting liquid. Alternatively, movement of the particles between the two liquids could be used to provide a threshold for switching of the system, thus opening up the possibility of passive matrix driving of the system.

Finally, a beaded outward sheet TIR display system may be modified by using particles containing multiple absorption or scattering centers. Consider a "raisin bun" particle in which a plurality of small light-scattering and/or light-absorptive centers (formed, for example, from carbon black) are distributed within a light-transmissive matrix. If such particles are present in a beaded outward sheet system adjacent the surface at which TIR would otherwise occur (at the beads), and the refractive index of the matrix is not too dissimilar to that of the material forming the surface, the light reaching the surface will enter the matrix and will be scattered and/or absorbed by the various centers, so that essentially none of the light emerging from the surface re-enters that surface. The optical effect of the particle will thus be identical to frustrated TIR, although achieved by a different mechanism. This type of particle permits a wider choice of materials to be used in beaded TIR systems.

The inventions described in Sections A-C to prevent particle migration and settling and to reduce or eliminate non-uniformity in the electric field in beaded front plane, TIR-frustratable displays may be used in applications such as, but not limited to, electronic book readers, portable computers, tablet computers, cellular telephones, smart cards, signs, watches, shelf label or flash drives.

It will be apparent to those skilled in the technology of image displays that numerous changes and modifications can be made in the preferred embodiments of the invention described above without departing from scope of the invention. Accordingly, the foregoing description is to be construed in an illustrative and not in a limitative sense, the scope of the invention being defined solely by the appended claims.

What is claimed is:

1. An image display device comprising:
    a reflective sheet having a hemispherical beaded inward surface and an opposed outward surface;
    a low refractive index fluid contacting the beaded surface;
    a plurality of charged electrophoretically mobile particles suspended in the low refractive index fluid;
    means for applying a voltage across the low refractive index fluid to selectively move the particles closely adjacent the beaded surface to frustrate total internal reflection at the beaded surface of light rays passing through the reflective sheet;
    a rear support disposed on the opposed side of the low refractive index fluid comprising suspended charged particles from the reflective sheet; and
    a plurality of cross-walls extending from the reflective sheet to the rear support and separating the low refractive index fluid into a plurality of micro-cells isolated from one another by the cross-walls,
        the low refractive index fluid having an index of refraction sufficiently smaller than the index of refraction of the reflective sheet such that most of the light passing through the reflective sheet undergoes total internal reflection at the beaded surface when the particles are not closely adjacent the beaded surface.

2. An image display device according to claim 1 wherein the cross-walls form a plurality of square shaped micro-cells.

3. An image display device according to claim 1 wherein the cross-walls form a plurality of hexagonal shaped micro-cells.

* * * * *